(12) United States Patent
Mizutani

(10) Patent No.: US 8,595,400 B2
(45) Date of Patent: Nov. 26, 2013

(54) PROGRAMMABLE CONTROLLER USING MASTER-SLAVE COMMUNICATION

(75) Inventor: Seiji Mizutani, Moriyama (JP)

(73) Assignee: Omron Corporation, Kyoto (JP)

( * ) Notice: Subject to any disclaimer, the term of this patent is extended or adjusted under 35 U.S.C. 154(b) by 36 days.

(21) Appl. No.: 13/399,100

(22) Filed: Feb. 17, 2012

(65) Prior Publication Data

US 2012/0179849 A1    Jul. 12, 2012

Related U.S. Application Data

(63) Continuation of application No. PCT/JP2011/055679, filed on Mar. 10, 2011.

(30) Foreign Application Priority Data

Mar. 15, 2010   (JP) ................. 2010-058252

(51) Int. Cl.
    *G06F 13/00* (2006.01)
(52) U.S. Cl.
    USPC ............ 710/110; 700/3; 700/8; 700/13
(58) Field of Classification Search
    USPC ................ 710/110; 700/3, 8, 11, 13
    See application file for complete search history.

(56) References Cited

U.S. PATENT DOCUMENTS

| 5,933,478 | A  | 8/1999  | Ozaki et al.    |
| 7,852,790 | B2 | 12/2010 | Furuishi et al. |

| 2004/0117498 | A1  | 6/2004  | Hashimoto et al. |
| 2004/0210323 | A1* | 10/2004 | Muneta et al. ............ 700/21 |
| 2006/0282506 | A1  | 12/2006 | Furuishi et al.  |

FOREIGN PATENT DOCUMENTS

| JP | 8-97854      | 4/1996 |
| JP | 2001-195325  | 7/2001 |
| JP | 2001-237883  | 8/2001 |
| JP | 2004-186892  | 7/2004 |
| JP | 2007-128536  | 5/2007 |

OTHER PUBLICATIONS

International Search Report for corresponding International Application No. PCT/JP2011/055679, including English language translation, dated Apr. 19, 2011.
Written Opinion of the International Searching Authority for corresponding International Application No. PCT/JP2011/055679, including English language translation.

* cited by examiner

*Primary Examiner* — Glenn A Auve
(74) *Attorney, Agent, or Firm* — Greenblum & Bernstein, P.L.C.

(57) ABSTRACT

A programmable controller includes a master unit and a plurality of slave units connected to a system bus in a daisy chain. The master unit transmits a batch of transmission frames addressed to different slave units consecutively a predetermined plurality of times, without waiting to receive the response from the slave units. Thus, the transmission frames can be transmitted reliably.

15 Claims, 6 Drawing Sheets

PROGRAMMABLE CONTROLLER USING MASTER-SLAVE COMMUNICATION

CROSS-REFERENCE TO RELATED APPLICATIONS

This is a continuation application of PCT/JP2011/055679 filed Mar. 10, 2011, designating the United States of America, the disclosure of which, including the specification, drawings, and claims, is incorporated by reference in its entirety. The disclosure of Japanese Patent Application No. 2010-058252 filed Mar. 15, 2010, including the specification, drawings, and claims is expressly incorporated herein by reference in its entirety.

FIELD OF THE DISCLOSURE

The present disclosure relates to a programmable controller, and more specifically to an improved method for transmission between units using a system bus.

BACKGROUND INFORMATION

In network systems in FA (Factory Automation), one or a plurality of PLCs (Programmable Logic Controllers) that control input devices and output devices of industrial robots and other manufacturing equipment installed in manufacturing plants and devices that are controlled by the operation of the PLC are connected to a network of a control system.

A PLC is configured by coupling various types of units, such as a CPU unit and I/O units. Examples of I/O units are input units that are connected to sensors, switches or other input devices and take in their on/off signals as input signals, and output units that are connected to actuators, relays or other output devices and send out output signals to them. Based on output data that the MPU of the CPU unit has written into a memory of the output units, the output units output the output signals to the output devices. The input signals that are input into the input devices are stored in a memory within the input unit and the MPU of the CPU unit accesses this memory to obtain input data. Thus, the MPU of the CPU unit reads and writes data by accessing the memories of the individual units. However, as the processing speed increases, accessing the memories of the various units with the MPU to read and write data becomes difficult.

To address this problem, the present inventors have conceived the exchange of data between the units constituting a single PLC, utilizing communication technology between nodes connected to a PLC network cable. More specifically, data is exchanged by master-slave communication with the CPU unit as a master and the other units as slaves. Moreover, in this kind of communication technology, a specification is adopted in which an ACK frame is sent back from the recipient when a transmission frame has been properly received by the recipient, and if the ACK frame is not returned within a predetermined period of time, then the master judges that their delivery has failed and the frame is resent. Thus, the intended data can be reliably delivered to the recipient. This kind of resend technology is disclosed in Patent Document 1, for example.

PATENT DOCUMENTS

Patent Document 1: JP2004-186892A

PROBLEM SOLVED BY THE DISCLOSURE

However, it is not possible to employ the resend technology for communication between nodes that are connected in an ordinary network without any changes for data communication between the units of a PLC. That is to say, for the exchange of data between units constituting a PLC, it is desirable to transmission frame data successively at high speed. However, if a transmission frame containing the corresponding data is transmitted, it is confirmed whether an ACK frame is sent back from the recipient, the transmission frame is resent if it was not delivered, and the transmission frame containing the next data is transmitted if the transmission has finished, then the waiting time becomes long, and the merits of exchanging data at high speed using communication technology are lost.

Furthermore, it is necessary to give consideration to the influence of noise on the data communication. In order to avoid transmission errors due to noise, the above-described resend technology may be used, but the time for transmitting one transmission frame becomes very short due to the high-speed communication. As a result, in the case of communication using an ordinary network cable, noise that occurs in a single burst for a very short time, such as impulse noise, leads only to the loss of several bits within a single transmission frame, but when striving for high-speed communication, it may lead to the loss of entire transmission frames. Moreover, if transmission frames are sent out back to back in order to increase the communication speed to high-speed communication, then even noise occurring in short bursts, such as impulse noise, may damage a plurality of transmission frames before and after, and there is the risk of communication errors.

Accordingly, there is the problem of providing for reliable and fast communication between units constituting a PLC.

SUMMARY OF THE DISCLOSURE

In order to solve the above-noted problem, a programmable controller according to an aspect of the present disclosure includes a master unit and a plurality of slave units connected to a system bus. The master unit functions to transmit a batch of transmission frames addressed to different slave units consecutively a plurality of times (e.g., a predetermined plurality of times).

Thus, the master unit of the present disclosure transmits a batch of transmission frames addressed to different slave units consecutively a plurality of times. More specifically, in a first transmission process, it transmits this batch of transmission frames in a predetermined order. Then, in a second transmission process, it transmits the batch of transmission frames in a predetermined order. And so on, it repeats the transmission process for the set plurality of times. In certain aspects of the disclosure, the order of the first and the second transmission is the same, but in the present disclosure, it does not necessarily need to be the same. However, if it is the same, the processing (control) is simple. The slave units are units of the PLC, so that they are very close to the master unit and the transmission time of the transmission frames is short. Moreover, it is necessary to successively transmit to the units in a short time, and it may be desired that also for a plurality of transmission frames that are necessarily in a batch, the transmission interval is as short as possible. Furthermore, due to the demand for faster speeds, also the time that is required for transmitting a single transmission frame becomes shorter. As a result, even when there is noise occurring in a comparatively short interval, such as impulse noise, there is the risk that one entire transmission frame or a plurality of transmission frames is affected by the noise and cannot be properly delivered. However, with the present disclosure, as noted above, the transmission process for a batch of transmission frames is carried out a plurality of times, so that the same transmission frame is not transmitted consecutively. Therefore, even if it were not possible to deliver a plurality of consecutive transmission frames due to noise, it would not happen that all of the same transmission frames cannot be delivered due to noise. Thus, it is possible to deliver the transmission frames fast and reliably to the desired slave unit.

According to another aspect of the disclosure, the slave units function to return a set response in the case that (when) they have properly received a transmission frame. In one aspect of the disclosure, the master unit may be adapted to stop transmitting a corresponding transmission frame, even if the plurality of times has not yet been reached, if the master unit receives the response. The set response may be for example transmitting an ACK frame of an embodiment or transmitting an IN frame for a transmission request frame. Thus, if for example the response is quickly returned, as in case of a slave unit that is close to the master unit, then there is the possibility that this response is returned before the transmission frame is transmitted a plurality of times. In this case, if the response is received, then this transmission frame has been properly delivered to the recipient, so that it is unnecessary to transmit it any further.

Accordingly, after receiving the response, the corresponding transmission frame is not transmitted anymore, so that only the necessary transmission frames can be transmitted and the load on the communication of the system can be alleviated.

According to another aspect of the disclosure, if the master unit has received a plurality of the responses for the same transmission frame, the second and any further (subsequent) of the responses may be discarded. In the case of a returned response, a predetermined receive process is executed, and it is stored in a memory or the like. If response for the same transmission frame could be received once, then it has been confirmed that this transmission frame has been correctly delivered to the recipient, so that the process of receiving further responses is not necessary, and is an unnecessary waste of memory, which is undesirable. Accordingly, in accordance with an aspect of the present disclosure, by discarding the second and further responses, it is possible to suppress the execution of unnecessary processing.

According to another aspect of the present disclosure, the programmable controller may include a block unit into which the one master unit and a plurality of slave units are integrated, and an extension block unit into which the plurality of slaves are integrated. The block unit and the extension block unit may be connected by an extension cable. The number of times for transmitting consecutively a plurality of times is set to be larger for transmission frames that are addressed to the slave units constituting the extension block unit than for transmission frames that are addressed to the slave units constituting the block unit. If there is an extension cable, then the influence of noise before and behind it is different. That is to say, transmission frames for slave units that are on the downstream side of the extension cable, as seen from the master unit, are more susceptible to noise than transmission frames for slave units on the upstream side, and there is a high probability that proper transmission is not possible. Consequently, by setting the number of consecutive transmissions large for slave units constituting an extension block unit that is on this downstream side, it is possible to deliver reliably. By contrast, in the case of slave units constituting a block unit that is coupled to the CPU unit, the possibility is high for a proper transmission even with a lower number of one or two transmissions. Consequently, delivery is possible even when the number of the plurality of consecutive transmissions is low, and accordingly it is possible to suppress the occurrence of such unnecessary processing as keeping transmitting the same frame even after it has been properly received.

According to another aspect of the disclosure, the number of times for transmitting consecutively a plurality of times may be the same for all transmission frames of the batch. Thus, the managing of the number of transmissions can be carried out comprehensively, which is preferable. According to still another aspect of the disclosure, the number of times for transmitting consecutively a plurality of times may differ among transmission frames of the batch. With this configuration, it is possible to perform transmission processing more reliably without waste, by setting a suitable number of transmissions for each slave unit.

According to another aspect of the disclosure, a master communication circuit serving as a master in a master-slave communication is provided, including a sender controller that sends a transmission frame addressed to a slave communication circuit, a receiver controller that receives a response from the slave communication circuit, and a communication controller. The communication controller that causes the send controller to transmit a batch of transmission frames addressed to different slave communication circuits consecutively a predetermined plurality of times without waiting for reception of the response from the slave communication circuits by the receiver controller.

According to another aspect of the disclosure, the communication controller is configured to is configured to stop transmitting a corresponding transmission frame, when the receiver controller receives the response, even if the predetermined plurality of times has not yet been reached. According to yet another aspect of the disclosure, when the receiver controller has received a plurality of the responses for the same transmission frame, communication controller discards the second and any subsequent of the responses.

EFFECT OF THE DISCLOSURE

With the present disclosure, transmission frames are transmitted consecutively a plurality of times, so that the communication between units constituting a PLC can be carried out reliably and fast.

DETAILED DESCRIPTION

Figure 1:
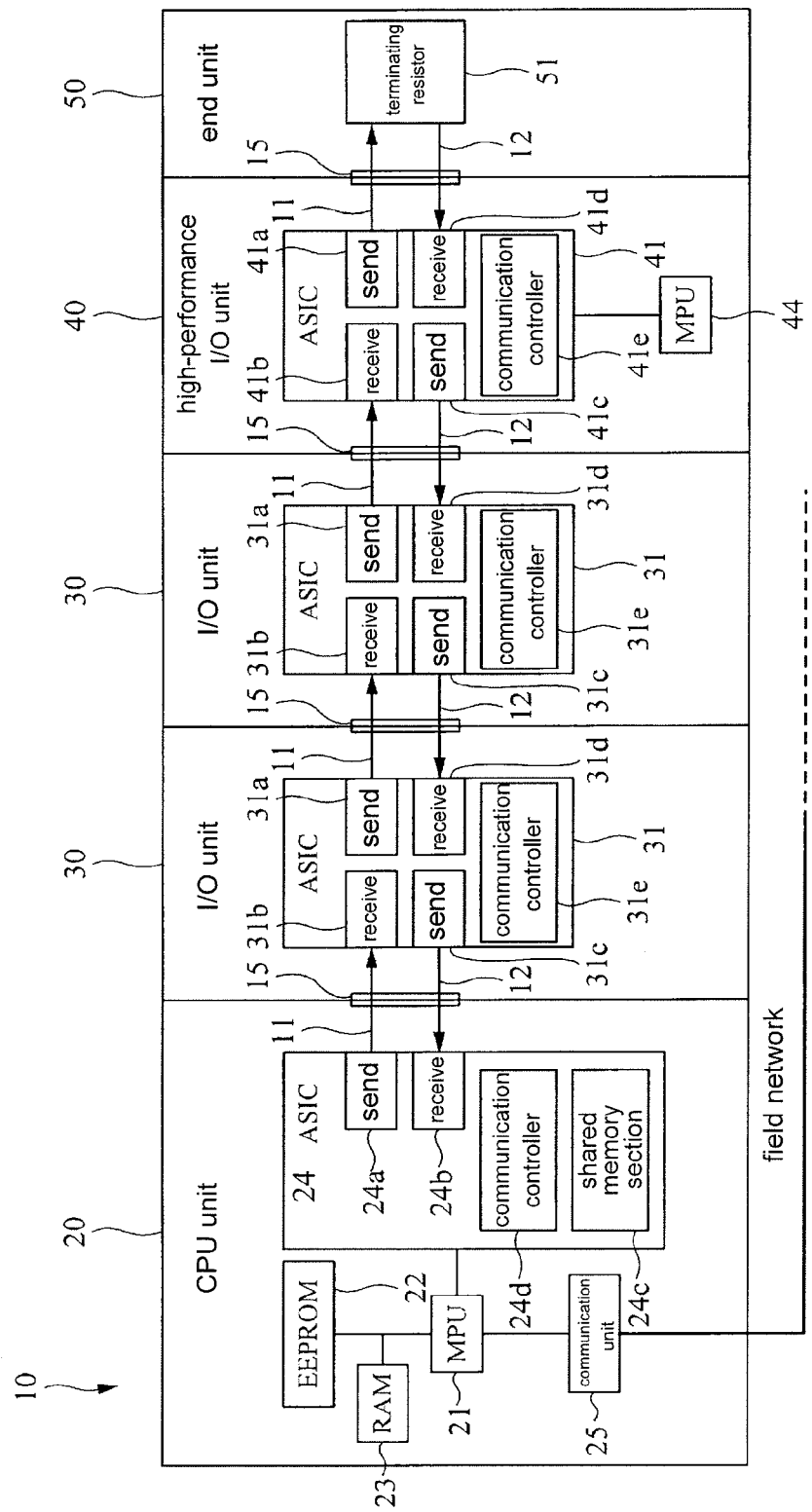
FIG. 1 is a diagram of a suitable first embodiment of a programmable controller according to the present disclosure.

FIG. 1 shows a first embodiment of a programmable controller (referred to below as "PLC") 10 according to the present disclosure. This PLC 10 is configured by coupling a plurality of units for realizing various kinds of functions. The plurality of units includes at least one CPU unit 20. Furthermore, the PLC 10 of the present embodiment includes I/O units 30 (for example, an input unit, an output unit or an input/output unit), a high-performance I/O unit 40 (for example, a high-performance input unit, a high-performance output unit or a high-performance input/output unit), and an end unit 50. While not shown in the figures, it also includes a power unit for providing power to the various units constituting the PLC 10. Needless to say, the units constituting the PLC 10 are not limited to those mentioned above, and units may be added or left out, as necessary in accordance with the control to be executed.

These units each include a connector 15 on the side wall of a case. The individual units can be electrically connected by coupling the connectors 15 together. That is to say, one end of a high-speed serial communication line is connected to each connector 15, and the other end of this high-speed serial communication line is connected to internal circuitry (an ASIC in the present embodiment) of the unit. Moreover, a power line is also connected. Thus, by coupling the connectors 15 of adjacent units together, power can be supplied to the units from a power source unit, and data can be exchanged among the units.

Communication among the units of the PLC 10 is carried out at high speed using an ASIC. Moreover, in the present embodiment, a system bus that is constituted by the high-speed serial communication line is constituted by two lines, namely a downstream system bus 11 and an upstream system bus 12. Thus, by fixing the direction of frames that are communicated over these system buses 11 and 12, the probability of collisions between frames during communication is reduced, and a more reliable and smooth transmission becomes possible.

The CPU unit 20 also controls the operation of the various devices that constitute an FA network and cyclically executes "common processing", "IN refresh" (a process in which a master reads out data from slaves), "computation/execution of user programs", "OUT refresh" (a process in which data is written from the master to the slaves), and "peripheral services". The CPU unit 20 serves as a master and manages the communication with the various units (slaves) connected with the system buses 11 and 12.

The CPU unit 20 includes an MPU 21, an EEPROM 22, a RAM 23, an ASIC 24, and a communication circuit 25. The EEPROM 22 stores a system program for the CPU unit, user programs, and IO data such as IN data and OUT data. The MPU 21 is a microprocessor unit for the CPU unit, and performs the overall control of the PLC by executing the system program or user program stored in the EEPROM 22. The RAM 23 is a memory that is used as a working memory when operating the MPU 21.

The AISC 24 has a function of executing a portion of the user program. Moreover, its relevance for the present disclosure is that the ASIC 24 has a function of performing master-slave communication with the other units. That is to say, the ASIC 24 has an MPU interface section (not shown in the drawings) for communicating with the MPU 21, a shared memory section 24c storing IO data or the like that is exchanged with the slave units, a communication controller unit 24d that manages the master-slave communication with the slave units, as well as a send control section 24a and a receive control section 24b that are connected to the system buses 11 and 12 and actually send and receive the data. As described above, the transmission directions of the system buses 11 and 12 are respectively fixed to a single direction, so that the send control section 24a is connected to the downstream system bus 11 and the receive control section 24b is connected to the upstream system bus 12. Send control section 24a, receive control section 24b, and communication controller unit 24d could also be internal elements of a FPGA (Field Programmable Gate Array) or circuits having discrete parts (transistors, resistors, etc.), or other hardware operated by software.

The communication circuit 25 communicates with devices, such as remote I/O devices, connected to a field network.

The I/O units 30 and the high-performance I/O unit 40 are input units that are connected to input devices such as sensors, switches or the like and take in their on/off signals as input signals, or output units that are connected to output devices such as actuators, relays or the like and send out output signals to these. The units 30 and 40 serve as slave units. Other alternatives for slave units include motor drivers (motor amplifiers or motor controllers) such as servo motor drivers.

The I/O units 30 include an ASIC 31 as well as interfaces (not shown in the drawings) for sending and receiving input signals and output signal to/from external devices to which the I/O units 30 are connected. The ASIC 31 is connected to the system buses 11 and 12 in a daisy-chain connection. Thus, the ASIC 31 includes, for example, a send control section 31a and a receive control section 31b that are connected to the downstream system bus 11, a send control section 31c and a receive control section 31d that are connected to the upstream system bus 12, and a communication controller section 31e. When a frame that is transmitted over the downstream system bus 11 is received with the receive control section 31b, the communication controller section 31e of the ASIC 31 executes a predetermined process and sends it out from the paired send control section 31a to the slave unit on the downstream side. Similarly, when a frame that is transmitted over the upstream system bus 12 is received with the receive control section 31d, the communication controller section 31e executes a predetermined process and sends it out from the paired send control section 31c to the neighbouring unit on the upstream side. Needless to say, if the frames that are received by a unit over the downstream system bus 11 are addressed to that unit itself and a response/ACK is returned to the CPU unit 20 as the processing result, then this response is transmitted from the send control section 31c to the upstream system bus 12.

The high-performance I/O unit 40 includes an MPU 44, in addition to an ASIC 41 and interfaces (not shown in the drawings) for sending and receiving input signals and output signal to/from external devices to which the I/O unit 40 is connected, like the I/O units 30. With the MPU 44 executing more complex processing, the high-performance I/O unit 40 cyclically executes a series of processes, such as a computation process, IO refresh, a common process and peripheral services. That is to say, the high-performance I/O unit 40 has a function of controlling the operation of an output device connected to it, and may also be called a "special unit". The computation process may be one in which a preset program is executed, or it may be one in which a user program is executed.

Moreover, the ASIC 41 of the high-performance I/O unit 40 is connected in a daisy-chain connection to the system buses 11 and 12. Thus, the ASIC 41 includes, for example, a send control section 41a and a receive control section 41b that are connected to the downstream system bus 11, a send control section 41c and a receive control section 41d that are connected to the upstream system bus 12, and a communication controller section 41e. Moreover, since the high-performance I/O unit 40 includes the MPU 44, the ASIC 41 includes an MPU interface section. In the present embodiment, since the high-performance I/O unit 40 is the final unit that is furthest removed from the CPU unit 20, an end unit 50 is installed after it. The transmission control unit 41a of the ASIC 41 of the high-performance I/O unit 40 is connected to a terminating resistor 51 within the end unit 50.

The following is an explanation of the function of transmitting a frame from the master unit, which is an important part of the present disclosure. The ASIC 24 of the CPU unit 20 serving as the master unit produces and transmits various kinds of frames. The transmitted frames are, for example, an OUT frame for transmitting OUT data, a transmission request frame for requesting IN data from a slave, a transmission request frame for requesting the transmission of message data from a slave, or an interrupt frame that is transmitted due to an interrupt occurring in an application.

These transmission frames store the data to be transmitted by the MPU 21 in a transmission table within the shared memory section 24c of the ASIC 24. Then, when the execution timing of the ASIC 24 comes, the communication controller section 24d reads out this data, the data is given to the send control section 24a, encoded by appending a header and a correction code, subjected to parallel/serial conversion and transmitted to the downstream system bus 11. Moreover, a unique transaction ID for every frame of each transmission request is appended to the transmission frames.

When a slave unit, such as an I/O unit 30 or the high-performance I/O unit 40, receives a transmission frame with the receive control section 31b or 41b, the transmission frame is subjected to serial/parallel conversion, and then decoded and frame-checked. If the check is successful, and if it is a transmission frame addressed to that unit, then predetermined processing is executed based on the data transmitted with the transmitted frame.

That is to say, if the received transmission frame is an OUT frame, the slave unit carries out an OUT refresh based on the OUT data transmitted to it, generates an ACK frame, and sends it from the send control section 31c or 41c to the master unit. When the ASIC 24 of the CPU unit 20 obtains this ACK frame via the receive control section 24b, the master unit recognizes that the previously transmitted OUT frame has been received by the slave unit. Moreover, if the received transmission frame is a transmission request frame requesting IN data, then the slave unit prepares an IN frame that contains the latest IN data, and returns this IN frame from the send control section 31c or 41c to the master unit. If the received transmission frame is a transmission request frame requesting message data, and if there is a message within the slave unit that can be transmitted at the time the frame is received, then the slave unit prepares a message frame containing this message, and returns it from the send control section 31c or 41c to the master unit. Furthermore, if the transmission frame received by the slave unit is an interrupt frame, then the ASIC of the slave unit performs processing in response to the interrupt request, prepares an ACK frame, and sends it from the send control section 31c or 41c to the master unit. The transaction ID appended to the received transmission frame is appended to this ACK frame. Thus, taking the transaction ID as a key, the CPU unit 20 recognizes to which transmission request the received ACK frame belongs.

Moreover, since it is a daisy-chain connection, the transmission frame received with the receive control section 24b of the slave unit is given to the communication controller section 31e or 41e, it is ultimately subjected to parallel/serial conversion by the send control section 31a or 41a, and output to the downstream system bus 11 serving as the transmission path.

Figure 2:
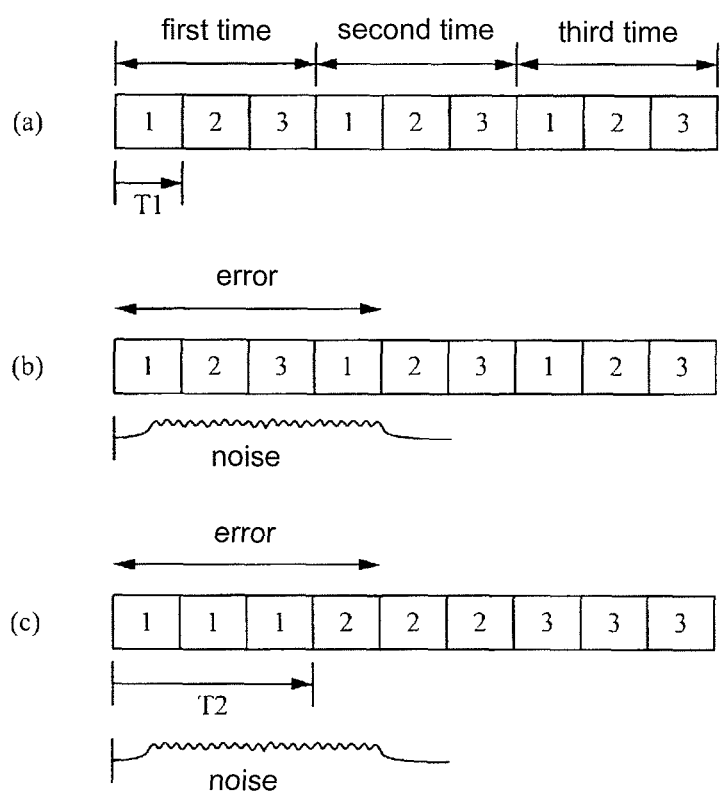
FIG. 2 is a diagram illustrating consecutive transmission.

In this embodiment, the ASIC 24 of the CPU unit 20 serving as the master unit transmits a batch of a plurality of transmission requests set in a transmission table within the shared memory section 24c repeatedly for a predetermined number of times in a predetermined order without waiting for the reception of an ACK frame from the slave unit. That is to say, there are, for example, three transmission requests, and when the number of repeated transmissions s is three, then the ASIC 24 executes the transmission process with the timing shown in FIGS. 2(a) and 3. For illustrative reasons, FIG. 2 shows only the numbers of the transmission frames of the various transmission requests. Moreover, the transmission frames are transmitted successively back to back. Thus, high-speed transmission on the system bus is ensured, and high-speed communication between the various units constituting the PLC 10 is guaranteed.

First, the ASIC 24 prepares and transmits the transmission frames of the various transmission requests in the order of transmission request 1, transmission request 2, transmission request 3, as the first transmission process. Then, when the ASIC 24 has transmitted the transmission frame of the final transmission request 3 of that group, it moves on to the second transmission process, and prepares and transmits the transmission frames of the various transmission requests in the order of transmission request 1, transmission request 2, transmission request 3. After this, the ASIC 24 moves on to the third transmission process, and prepares and transmits the transmission frames in order from the transmission request 1. Then, after the ASIC 24 has transmitted the transmission frame of the transmission request 3, it starts a timer for monitoring an ACK check time. Needless to say, it is also possible to launch an ACK monitoring timer for every transmission that is ordinarily carried out.

When the ASIC 24 receives an ACK frame, it can recognize from the transaction ID contained therein to which transmission request the received ACK frame corresponds. The received ACK frame is stored in a predetermined memory area of the shared memory section 24c. Then, at the time at which the ACK check time has passed in the timer, the ASIC 24 judges whether ACK frames (or a response from the slave unit, such as an IN frame) corresponding to all transmission request frames requiring an ACK have been sent back, and if there is a delivery confirmation for all transmission frames belonging to the transmission request group, then the process is properly finished. Needless to say, depending on the types of transmission frames, there are also transmission frames that are only sent out and for which no response is requested from the slave unit, and such transmission frames can be accommodated by regarding an ACK as having been transmitted or by eliminating them from the frames to be monitored. On the other hand, if it is judged that a transmission frame could not be properly transmitted, the MPU 21 and/or the ASIC 24 of the CPU unit 20 executes a predetermined process. Needless to say, if an ACK monitoring timer is activated every time an ordinary transmission is carried out, then the above-noted judgment whether the frame could be properly transmitted or not may also be carried out at that time.

Thus, by repeatedly transmitting a plurality of transmission frames in order, even when impulse noise is generated as shown in FIG. 2(b) for example, and a situation occurs in which a plurality of consecutive transmission frames cannot be properly delivered, all transmission frames can be reliably delivered by repeatedly transmitting them a plurality of times (e.g., a predetermined plurality of times). That is to say, since, in contrast to communication between nodes that are connected by an ordinary network cable, the data communication takes place within the system bus of the PLC, and what is more, at a higher communication speed than conventionally, the time needed to transmit one transmission frame for example, is about several dozen nanoseconds to several hundred nanoseconds, and if the communication speed is accelerated, then this time becomes even shorter. On the other hand, impulse noise occurs for a time of at least several hundred nanoseconds. Consequently, the influence of impulse noise on ordinary network communication is that only several bits within one transmission frame will be lost, whereas in the PLC of the present embodiment, the overall transmission frame will result in an error. What is more, the transmission frames are transmitted consecutively back to back, so that a consecutive plurality of transmission frames may result in an error. But even if four transmission frames, namely from the first transmission request 1 to the second transmission request 1, result in an error as shown in FIG. 2(b), the transmission request 2 and the transmission request 3 can be delivered to the slave unit with the second transmission process, and the transmission request 1 can be delivered to the slave unit with the third transmission process.

By contrast, even if the same transmission frame is transmitted a plurality of times, but the transmission frames for the same transmission request are transmitted consecutively for a plurality of times, and then the transmission frames for another transmission request are transmitted consecutively for a plurality of times, then there is the risk that they cannot be delivered properly. If the transmission frames for three transmission requests are transmitted three times each, then, the transmission frame for the transmission request 1 would be at first transmitted three times consecutively, and then the processing would shift to the transmission processing for the transmission frames for the transmission request 2, as shown in FIG. 2(c). In this case, if the first four transmission frames from the beginning cannot be delivered due to noise as in FIG. 2(b), then the frames are properly delivered only from the second transmission of the transmission request 2, as shown in FIG. 2(c), so that there is the adverse effect that the transmission request 1 cannot be delivered.

Moreover, if there is no noise and all transmission frames to be transmission processed are properly transmitted, then, with the present embodiment, as shown in FIG. 2(a), the minimum time T1 from the transmission start of the transmission request 1 to the transmission of the transmission request 2 will be the time for transmitting one transmission frame, and this time is constant regardless of the number of times the frames are repeatedly transmitted. By contrast, if the same transmission frame is transmitted a plurality of times as shown in FIG. 2(c), then the minimum time T2 from the transmission start of the transmission request 1 to the transmission of the transmission request 2 will be the time for transmitting three transmission frames. Moreover, there is the problem that this time will be longer, the more often the frames are transmitted repeatedly. If the number of times of repeated transmissions is increased, in order to improve the robustness against noise, then this difference becomes even more noticeable.

Moreover, the CPU unit 20 serving as the master unit adds a transaction ID to the transmission frames that is unique for each transmission request. Therefore, the CPU unit 20 adds the same transaction ID as for the first transmission frame also to the transmission frames of the same transmission request consecutively transmitted the second and further times. That is to say, if the transmission frame for the transmission request 1 is repeatedly transmitted three times, then all three transmission frames have the same transaction ID.

Figure 3:
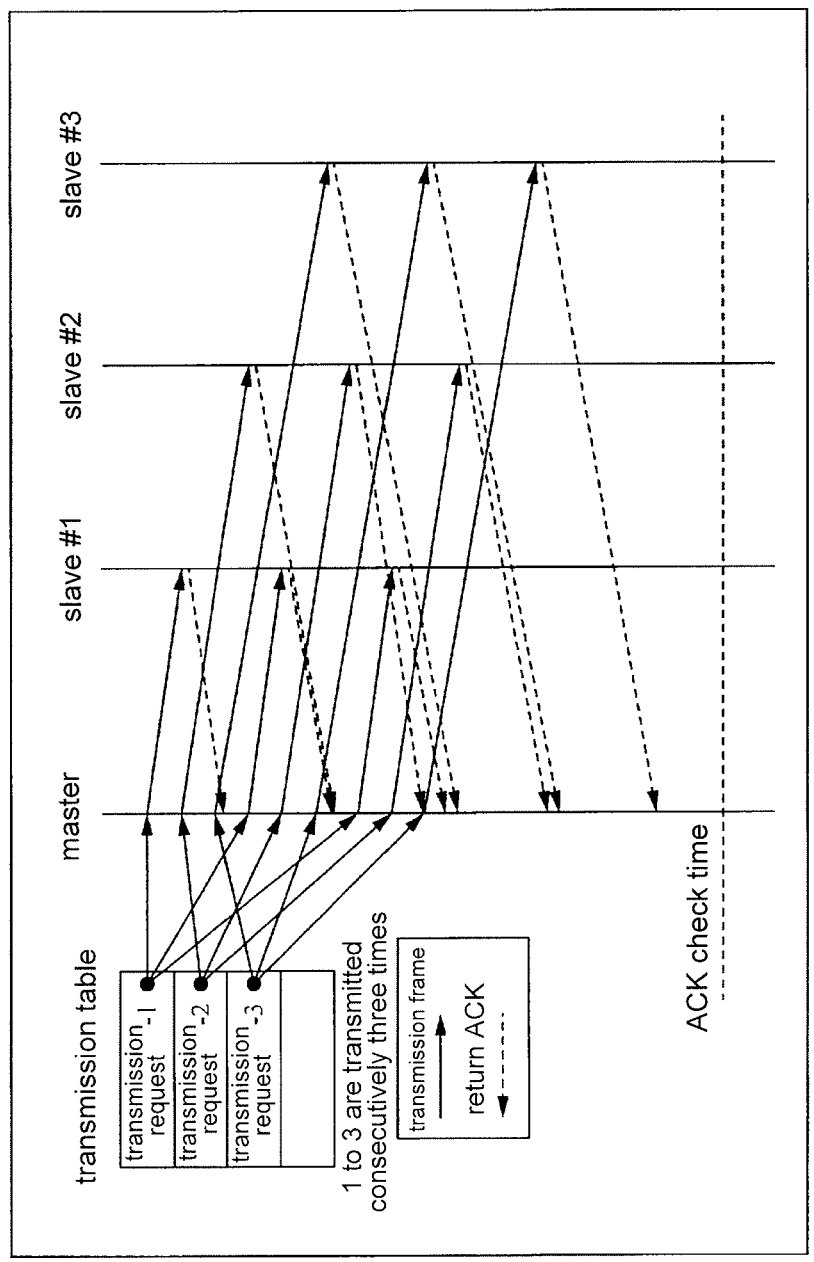
FIG. 3 is a diagram illustrating consecutive transmission.

Therefore, as shown in FIG. 3, the slave unit (on the receiving side) receives a plurality of frames with the same transaction ID, and in this case, the slave unit sends back the following response: The ASIC of the slave unit sends back an ACK frame every time it receives an OUT frame. Thus, also the ACKs will be more robust against noise, since the ACK frames from the same slave are not sent back consecutively but spread out. Note that if the same transmission frame is transmitted consecutively a plurality of times, then also the ACK frames from the slave unit receiving this transmission frame are transmitted consecutively, and there tends to be a similar susceptibility to noise as during transmission.

Moreover, the ASIC of the slave unit discards the OUT data (transmission request) that was sent to it with an OUT frame received for the second time or later without doing an OUT refresh or the like using it. Thus, the slave unit does not perform unnecessary update or rewrite processes.

The ASIC of a slave unit that has received a transmission request frame for IN data prepares and sends back an IN frame with the newest IN data, and the ASIC of a slave unit that has received a transmission request frame for a message sends back a message frame with message data that can be transmitted at the receiving time. Since processing is performed in accordance with the cause for the previous interrupt, the ASIC of a slave unit that has received an interrupt request frame does not perform an update of the interrupt cause, but sends back an ACK frame to notify proper reception.

Figure 4:
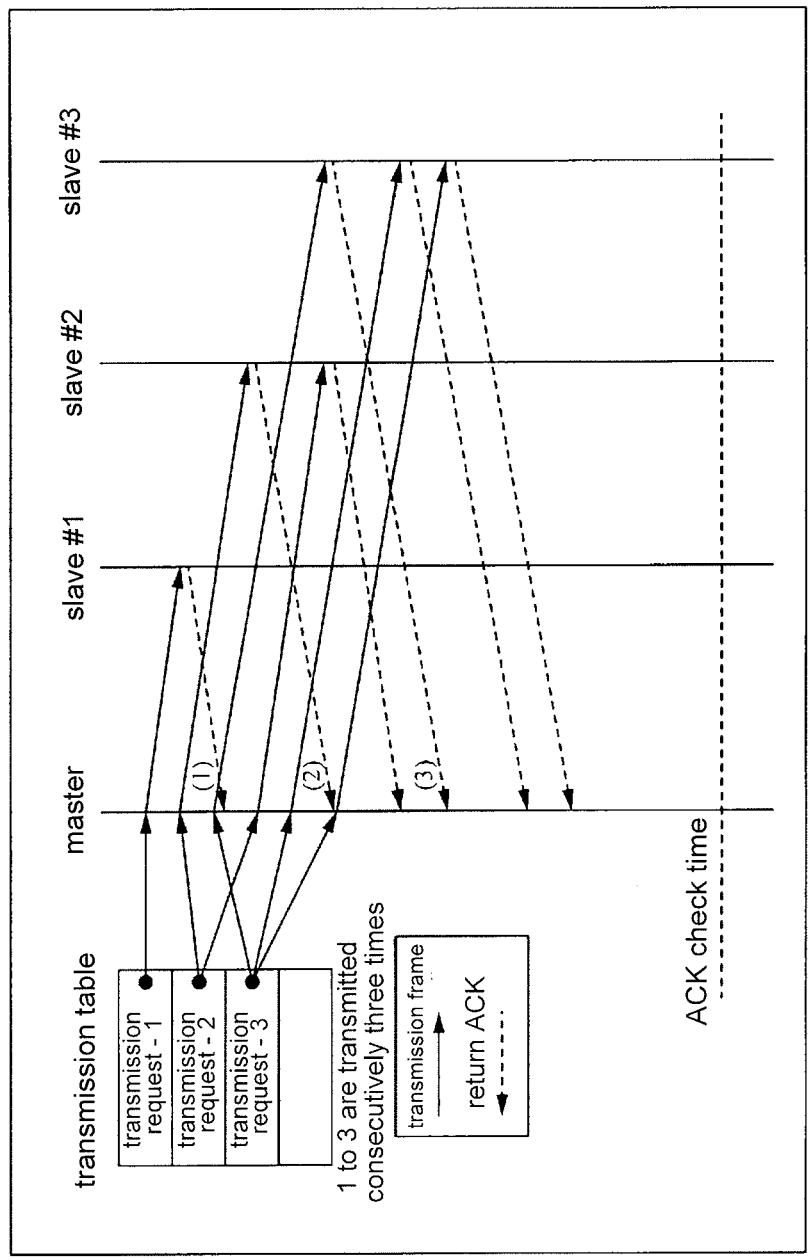
FIG. 4 is a diagram illustrating a second embodiment.

FIG. 4 shows the functionality of the principal parts of a second embodiment of the present disclosure. In the above-described first embodiment, transmission requests belonging to the same group are transmitted repeatedly a predetermined number of times. Thus, even if all transmission frames have been delivered to the desired slave in the first transmission process, a second and a third transmission process will still be carried out. In this case, the second and the third transmission processes are actually unnecessary, so that they will lead to a congestion of communication traffic and a delay of the transmission of other transmission requests, as well as to an increase in the processing load at the individual units, which is undesirable. Furthermore, three transmission requests have been shown here for illustrative reasons, but if the number of slaves is large and the number of transmission requests constituting one group increases, or the number of repeated transmissions is increased in order to enhance the robustness against noise, then this problem will be even more conspicuous.

To address this problem, in the present embodiment, if a delivery confirmation is obtained during the execution of the consecutive transmission, and the slave unit that has properly finished could be determined, then the properly delivered transmission frames whose delivery could be properly confirmed are not transmitted any further, even if the number of transmissions has not yet reached the set predetermined number. Thus, the number of unnecessary transmission processes of transmission frames can be reduced and the transmission frames can be transmitted quickly and with high efficiency.

More specifically, if an ACK frame is received during the execution of the consecutive transmission, then the transmission frame of the corresponding transmission request is not transmitted (the transmission process is skipped). The corresponding request frame can be specified from the transaction ID that is stored in the ACK frame. For the skipped process, a transmission-finished flag associated with the transmission request can be provided in the transmission table, and this transmission-finished flag can be set to ON if the ACK frame is received. In one possible realization, the communication controller section 24d reads out the transmission requests in order when specifying the transmission requests for the transmission process, and at this time, the communication controller section 24d does not read out the transmission requests for which the transmission-finished flag is ON, but moves on to the next transmission request. Moreover, for each of the transmission requests stored in the transmission table, the remaining number of transmissions is stored in association. The initial number is the set number of consecutive transmissions, and in the examples of FIGS. 2 and 3 explained in the first embodiment, it is set to "3". Moreover, for each single transmission, this number is reduced by 1, and when it is "0", that turn of consecutive transmission is finished, and the communication controller section 24d waits for the ACK check. In this situation, if an ACK frame is received underway, this remaining number is updated to "0". Thus, even if it is the turn for a transmission request after the corresponding ACK frame has been received, this transmission request is skipped, because the remaining number is "0", and the next transmission request can be transmitted.

In particular for slave units for which a large number of transmission requests is entered into the transmission table and that are arranged close to the master unit, the time necessary for communicating transmission frames and ACK frames is short, so that the possibility that a delivery confirmation is properly finished during the execution of the consecutive transmission is high.

An example showing a specific operation is shown in FIG. 4. Here, it is assumed that all transmission frames are delivered to the respective slave units without the occurrence of noise or the like. Moreover, it is assumed that the "transmission request 1" is addressed to the slave unit with the node number #1, the "transmission request 2" is addressed to the slave unit with the node number #2, and the "transmission request 3" is addressed to the slave unit with the node number #3. Moreover, the node numbers of the slave units are set to be rising from the side of the master unit. Thus, the node number #1 is the slave unit that is closest to the master unit. In the example of FIG. 1, the I/O unit 30 that is adjacent to the CPU unit 20 has the node number #1, the next I/O unit 30 has the node number #2, and the high-performance I/O unit 40 has the node number #3.

Moreover, in the present embodiment, the ASICs of the individual units are connected in a daisy chain, so once the transmission frame addressed to the slave unit with the node number #2 has been received by the ASIC of the slave unit with the node number #1, it is forwarded and received by the slave with the node number #2. Thus, the further away from the side of the master unit (CPU unit 20) a node is arranged (the larger the node number is), the longer is the time that is required to transmit a frame.

Under this premise, in a first transmission process, the transmission frames of the transmission request 1, the transmission frames of the transmission request 2 and the transmission frames of the transmission request 3 are transmitted successively in this order. Then, the transmission frames of the transmission request 1 are properly received at the slave #1, and an ACK frame is returned. Moreover, the transmission frame of the transmission request 2 is forwarded by the slave #1 and properly received at the slave #2 and an ACK frame is returned. This ACK frame is temporarily taken in by the slave #1 and is transferred and delivered to the master unit. Similarly, the transmission frame of the transmission request 3 reaches the slave #3, after passing through the slave #1 and the slave #2. Then, when it is properly received, an ACK frame is delivered to the master unit, passing through the reverse path of that noted above.

As shown in the drawing, based on the first transmission process, the ACK frame from the slave #1 is received by the master unit (this is indicated as (1)) before transmitting the transmission frame of the transmission request 1 in the second transmission process, so that the transmission for the transmission request 1 is skipped from the second time onward. Accordingly, the second transmission process is executed for the transmission frames of the transmission request 2 and the transmission request 3.

After the second transmission process has been finished, and before moving on to the third transmission process, the ACK frame from the slave #2 for the transmission frame of the transmission request 2 transmitted in the first transmission process is received by the master unit (this is indicated as (2)). Consequently, at that stage also the transmission request 2 is removed from the objects to be transmitted, and only the transmission frame of the transmission request 3 is transmitted in the third transmission process.

Moreover, after the third transmission process has been finished, and before the ACK check time is up, the ACK frame from the slave #3 for the transmission frame of the transmission request 3 transmitted in the first transmission process is received by the master unit (this is indicated as (3)). Thus, it is recognized that the delivery confirmation from the slave #3 is properly finished, and delivery could be properly accomplished for all transmission processes of that turn. The ACK check time is set to be sufficient in order to return the ACK frames for all transmission frames that are transmitted in the third transmission processes.

As should become clear from the drawing, after the transmission request 2 has been transmitted in the second transmission process, an ACK frame based on the first transmission process is received, so that thereafter, an ACK frame based on this second transmission process is returned from the slave #2. The master unit receives a total of three ACK frames for the transmission request 3.

Accordingly, if the receive control section 24b of the master unit receives an ACK frame, and after that receives the same ACK frame again due to the consecutive transmission, then this received ACK frame is discarded. Thus, for the same transmission frames, only one ACK frame is stored in the shared memory section 24c, so that unnecessary costs for memory space and storage processing can be decreased. Whether ACK frames are the same or not can be determined by whether the transaction ID is the same or not.

The foregoing example has been explained for ACK frames, but also in the case that an IN frame or the like is received, it can be determined that it has been properly received on the side of the slave unit, so that a similar transmission control as described above is carried out.

Moreover, in the above-described embodiment, the number of times that a transmission frame of a transmission request belonging to the same group stored in the transmission table is transmitted is set to be the same, but it may also be varied as appropriate. In this case, this can be realized in that the number of transmissions serving as an initial value to which the number of remaining transmissions is set is registered in association with each transmission request, and for each transmission, the value of this number of remaining transmissions is reduced by 1; and when 0 is reached, this transmission request is skipped, and when the number of remaining transmissions associated with all transmission requests has become 0, then it is waited until the ACK check time is up. Moreover, it is also possible to provide a plurality of transmission tables. In this case, if grouped together for the number of times of consecutive transmission, then there is no need to set or manage the transmission number for every transmission request, so that the control can be simplified.

Figure 5:
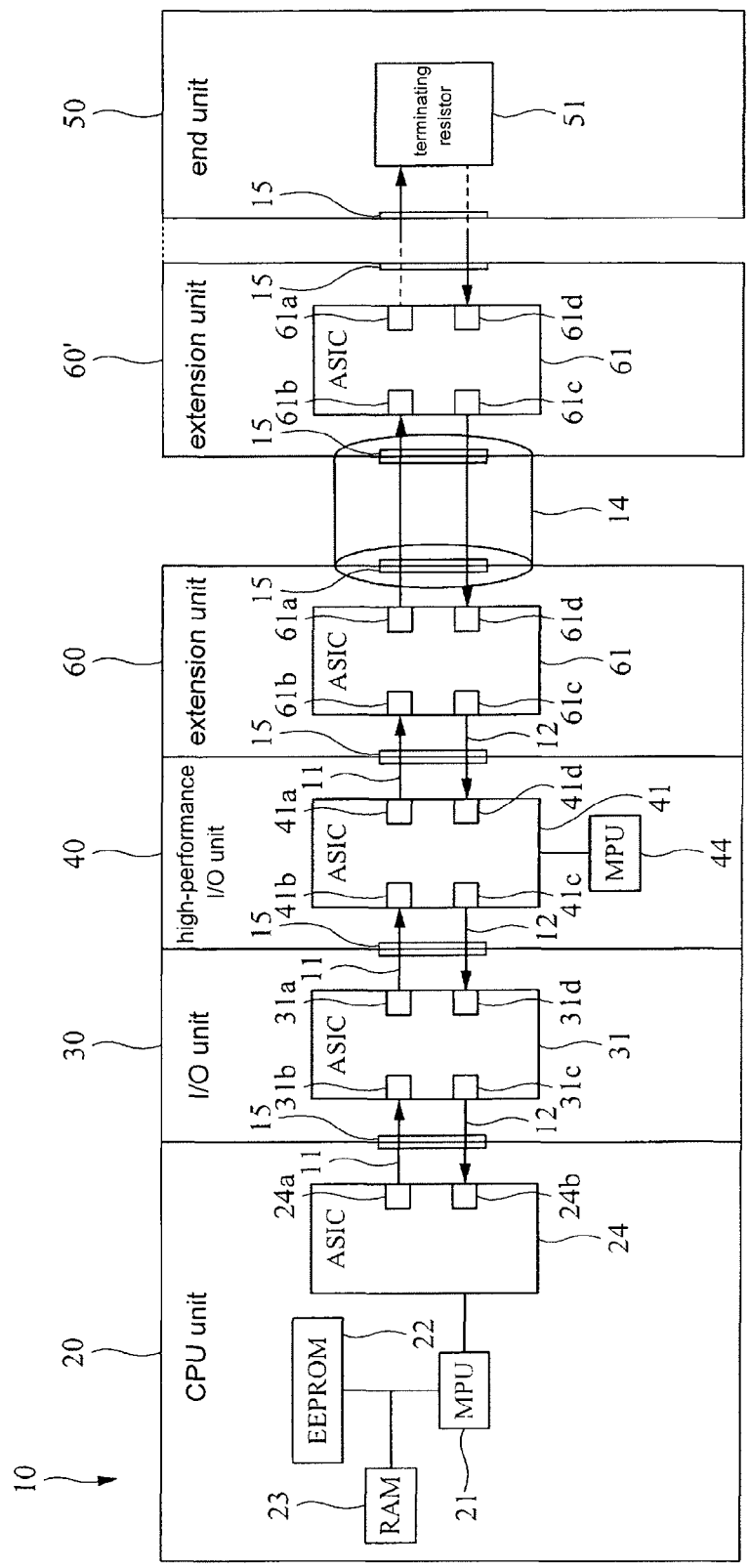
FIG. 5 is a diagram illustrating a modified example.

The number of consecutive transmissions may be set differently for each unit, depending on the noise environment of the units. For example, a PLC may be constituted by a plurality of blocks as shown in FIG. 5, by attaching extension units 60 to the final stage of the block unit constituted by coupling a plurality of units, and connecting these extension units 60 to each other with an extension cable 14. In this case, the transmission frames to the slave units beyond the extension cable 14 have a high probability of a communication error due to the influence of noise, so that the number of consecutive transmissions may be set to a large value, whereas since there is no extension cable between the CPU unit 20 and the slave units that are coupled together in the block unit including the CPU unit 20, there is little noise, so that the number of consecutive transmissions may be set to be low, reducing the occurrence of unnecessary transmissions.

Moreover, there is no need to set the number of consecutive transmissions to two or more for all slave units, and it is also possible to set the number of consecutive transmissions to one for those slave units that are close to the CPU unit 20, that is, to transmit only once and not transmit repeatedly for those units.

Furthermore, in the above-described embodiments, a type was described in which the side faces of the units are connected by connectors, but the present disclosure is not limited to this, and it is also possible that the slave units are mounted in slots provided in a base unit.

Moreover, in the above-described embodiments, the CPU unit 20 (master), the I/O units 30, and the high-performance I/PO unit 40 (slaves) are connected in a daisy chain, but this mode of connection does not necessarily have to be employed in the present disclosure, and other types of communication formats may be employed.

Figure 6:
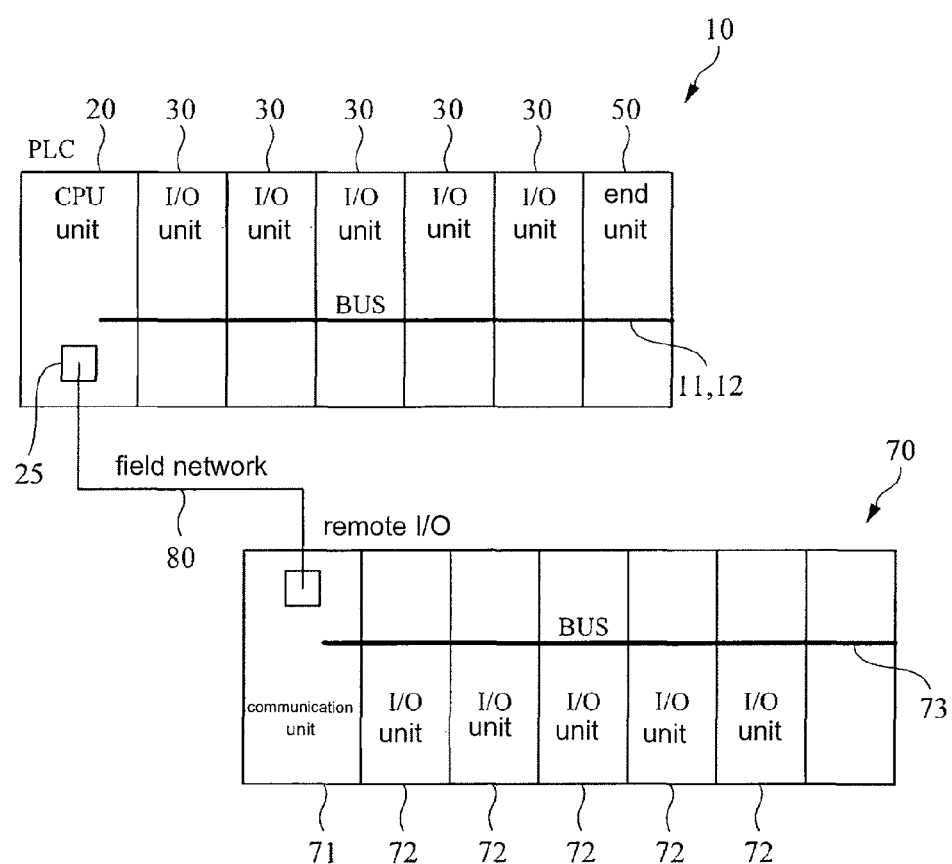
FIG. 6 is a diagram showing a modified example.

Moreover, for the technology of transmitting consecutively for a plurality of times when transmitting a frame from the master to a slave, it is also possible to apply a remote I/O terminal 70 that is connected to a network as shown in FIG. 6, for example. That is to say, when looking at the overall network, the PLC 10 serves as the master, and the devices connected to the field network 80 serve as the slaves, and data is exchanged between the PLC 10 and the devices by master-slave communication over the network. The devices may be individual devices, or they may be devices such as I/O terminals (also referred to as terminal I/O, terminal devices, for example), to which a plurality of I/O devices are connected. Moreover, as one form of such I/O terminals, there is a building-block-type remote I/O terminal 70, as shown in FIG. 6.

This remote I/O terminal 70 is configured by coupling a communication unit 71 and one or a plurality of I/O unit 72 (slice I/O units). These coupled units 71 and 72 are electrically connected by an internal bus (system bus) 73 and exchange data. The number of I/O units can be increased or reduced as suitable, so that they can be changed and adjusted in accordance with the system configuration. The internal bus 73 may be configured as a plurality of lines, as in the system bus of the above-described embodiments.

Moreover, like the PLC 10, the remote I/O terminal 70 is coupled to and terminated by an end unit at the final stage, and it is also possible to couple a connection unit to this final stage and connect other remote I/O terminal with a connection cable.

The communication unit 71 is connected via the field network 80 to the communication circuit 25 of the CPU unit 20 of the PLC 10. The communication unit 71 has a function of communicating with devices, such as the PLC 10 connected to the field network 80, and a function of communicating with the I/O units 72 coupled to the communication unit 71. The data of the I/O unit 72 is temporarily collected by the communication unit 71, and exchanged in bulk with the PLC (CPU unit 20) serving as the master.

The communication unit 71 and the I/O unit 72 carry out master-slave communication, with, the communication unit 71 serving as the master and the I/O unit 72 serving as the slave. Moreover, when the communication unit 71 communicates with the I/O unit 72 via the internal bus 73, it is possible to employ a technology in which a batch of transmission frames is transmitted consecutively a plurality of times, as in the above-described CPU unit 20.

INDEX TO THE REFERENCE NUMERALS

10 . . . PLC, 11 . . . downstream system bus, 12 . . . upstream system bus, 14 . . . extension cable, 20 . . . CPU unit, 21 MPU, 24 . . . ASIC, 30 . . . I/O unit, 31 . . . ASIC, 40 . . . high-performance I/O unit, 41 . . . ASIC, 44 . . . MPU, 60 . . . extension unit, 70 . . . remote I/O terminal, 71 . . . communication unit, 72 . . . I/O unit

What is claimed is:

1. A programmable controller, comprising:
a master unit and a plurality of slave units connected to a system bus,
wherein the slave units are configured to return a response when the slave units have properly received a transmission frame sent by the master unit, and
wherein the master unit is configured to transmit a batch of transmission frames addressed to different slave units consecutively a predetermined plurality of times, without waiting to receive the response from the slave units.

2. The programmable controller according to claim 1,
wherein the master unit is configured to stop transmitting a corresponding transmission frame when the master unit receives the response, even if the predetermined plurality of times has not yet been reached.

3. The programmable controller according to claim 2,
wherein when the master unit has received a plurality of the responses for the same transmission frame, a second and any subsequent of the plurality of the responses are discarded.

4. The programmable controller according to claim 3, further comprising:
a block unit into which the master unit and the plurality of slave units are integrated; and
an extension block unit into which other slave units are integrated, the block unit and the extension block unit being connected by an extension cable,
wherein the number of times for transmitting consecutively the predetermined plurality of times is set to be greater for transmission frames that are addressed to slave units of the extension block unit than for transmission frames that are addressed to slave units of the block unit.

5. The programmable controller according to claim 3,
wherein the number of times for transmitting consecutively the predetermined plurality of times is the same for all transmission frames of the batch.

6. The programmable controller according to claim 3,
wherein the number of times for transmitting consecutively the predetermined plurality of times differs among transmission frames of the batch.

7. The programmable controller according to claim 2, further comprising:
a block unit into which the master unit and the plurality of slave units are integrated; and
an extension block unit into which other slave units are integrated, the block unit and the extension block unit being connected by an extension cable,
wherein the number of times for transmitting consecutively the predetermined plurality of times is set to be greater for transmission frames that are addressed to slave units of the extension block unit than for transmission frames that are addressed to slave units of the block unit.

8. The programmable controller according to claim 2, wherein the number of times for transmitting consecutively the predetermined plurality of times is the same for all transmission frames of the batch.

9. The programmable controller according to claim 2, wherein the number of times for transmitting consecutively the predetermined plurality of times differs among transmission frames of the batch.

10. The programmable controller according to claim 1, further comprising:
a block unit into which the master unit and the plurality of slave units are integrated; and
an extension block unit into which other slave units are integrated, the block unit and the extension block unit being connected by an extension cable,
wherein the number of times for transmitting consecutively the predetermined plurality of times is set to be greater for transmission frames that are addressed to slave units of the extension block unit than for transmission frames that are addressed to slave units of the block unit.

11. The programmable controller according to claim 1, wherein the number of times for transmitting consecutively the predetermined plurality of times is the same for all transmission frames of the batch.

12. The programmable controller according to claim 1, wherein the number of times for transmitting consecutively the predetermined plurality of times differs among transmission frames of the batch.

13. A master communication circuit serving as a master in a master-slave communication, comprising:
a sender controller that sends a transmission frame addressed to a slave communication circuit;
a receiver controller that receives a response from the slave communication circuit; and
a communication controller that causes the sender controller to transmit a batch of transmission frames addressed to different slave communication circuits consecutively a predetermined plurality of times without waiting to receive the response from the slave communication circuits by the receiver controller.

14. The master communication circuit according to claim 13,
wherein the communication controller is configured to stop transmitting a corresponding transmission frame when the receiver controller receives the response, even if the predetermined plurality of times has not yet been reached.

15. The master communication circuit according to claim 14,
wherein when the receiver controller has received a plurality of the responses for the same transmission frame, the communication controller discards a second and any subsequent of the plurality of the responses.

* * * * *